(12) United States Patent
Welker

(10) Patent No.: US 8,767,505 B2
(45) Date of Patent: Jul. 1, 2014

(54) IN-SEA POWER GENERATION FOR MARINE SEISMIC OPERATIONS

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 1360 days.

(21) Appl. No.: 11/953,584

(22) Filed: Dec. 10, 2007

(65) Prior Publication Data
US 2009/0147619 A1    Jun. 11, 2009

(51) Int. Cl.
*G01V 1/38* (2006.01)
*G01V 99/00* (2009.01)
*B63H 21/00* (2006.01)

(52) U.S. Cl.
CPC .............. *G01V 99/00* (2013.01); *B63H 21/00* (2013.01); *B63B 2760/00* (2013.01)
USPC .............................................. 367/15; 290/54

(58) Field of Classification Search
USPC ............. 367/15, 191; 60/495, 498, 499, 502, 60/503; 290/42, 43, 53, 54
See application file for complete search history.

(56) References Cited

U.S. PATENT DOCUMENTS

| | | | |
|---|---|---|---|
| 4,709,355 A * | 11/1987 | Woods et al. | 367/16 |
| 5,494,468 A | 2/1996 | Demarco, Jr. | |
| 6,984,902 B1 | 1/2006 | Huang et al. | |
| 7,199,480 B2 * | 4/2007 | Fripp et al. | 290/1 R |
| 7,404,370 B2 * | 7/2008 | Stokkeland | 114/253 |
| 2004/0239120 A1 * | 12/2004 | Yi | 290/42 |
| 2005/0230973 A1 | 10/2005 | Fripp et al. | |
| 2007/0212956 A1 | 9/2007 | Schmitz | |
| 2007/0228737 A1 | 10/2007 | Hirsch | |

FOREIGN PATENT DOCUMENTS

| | | |
|---|---|---|
| GB | 1435125 | 5/1976 |
| GB | 2311496 A * | 10/1997 |
| GB | 2311496 A * | 10/1997 |
| WO | 2007071975 | 6/2007 |

OTHER PUBLICATIONS

Kevin Farinholt, Energy Harvesting through Electromechemical Transducers.
Johnny M.H. Lee et al, Vibration-to-Electrical Power Conversion Using High-Aspect-Ratio MEMS Resonators, The Chinese University of Hong Kong.
Kenneth M. Newbury and Donal J. Leo, Linear Electromechanical Model of Ionic Polymer Transducers—Part I: Model Development, Journal of Intelligent Material Systems and Structures, Jun. 2003, vol. 14, Sage Publications.
Kenneth M. Newbury and Donal J. Leo, Linear Electromechanical Model of Ionic Polymer Transducers—Part II: Experimental Validation, Journal of Intelligent Material Systems and Structures, Jun. 2003, vol. 14, Sage Productions.
Henry A. Sodano et al, Harvesting of Electrical Energy from a Backpack Using Piezoelectric Shoulder Straps.

(Continued)

*Primary Examiner* — Krystine Breier

(57) ABSTRACT

A method for conducting seismic operations includes the steps of deploying a seismic streamer carrying an electrically powered device from a vessel into water having waves, providing an in-sea generator in electrical connection with the device, producing electricity from the in-sea generator by harvesting mechanical energy from the waves, and providing the produced electricity to the device.

18 Claims, 2 Drawing Sheets

(56) References Cited

OTHER PUBLICATIONS

Yuji Suzuki et al, Micro Catalytic Combustor with Tailored Pt/Al2O3 Films, 3rd International Workshop on Micro and Nanotechnology for Power Generation and Energy Conversion Applications, 2003, Power MEMS, Makuhari, Japan.
Extended European Search Report of European Application No. 08170982.6 (14.0360EP) dated Aug. 23, 2011: pp. 1-5.
Energy Harvester Converts low-level vibrations into usable electricity, 2004, Ferro Solutions Inc.
Kenneth M. Newbury and Donal J. Leo, Linear Electromechanical Model of Ionic Polymer Transducers-Part I: Model Development, Journal of Intelligent Material Systems and Structures, Jun. 2003, vol. 14, Sage Publications.
Kenneth M. Newbury and Donal J. Leo, Linear Electromechanical Model of Ionic Polymer Transducers-Part II: Experimental Validation, Journal of Intelligent Material Systems and Structures, Jun. 2003, vol. 14, Sage Productions.
Henry A. Sodano et al, Comparison of Piezoelectric Energy Harvesting Devices for Recharging Batteries, Journal of Intelligent Material Systems and Structures, Oct. 2005, vol. 16, Sage Publications.
Henry A. Sodano et al, A Review of Power Harvesting from Vibration using Piezoelectric Materials, The Shock and Vibration Digest, May 2004, vol. 36, No. 3, Sage Publications.
Yuji Suzuki et al, Micro Catalytic Combustor with Tailored Pt/AI203 Films, 3rd International Workshop on Micro and Nanotechnology for Power Generation and Energy Conversion Applications, 2003, Power Mems, Makuhari, Japan.

* cited by examiner

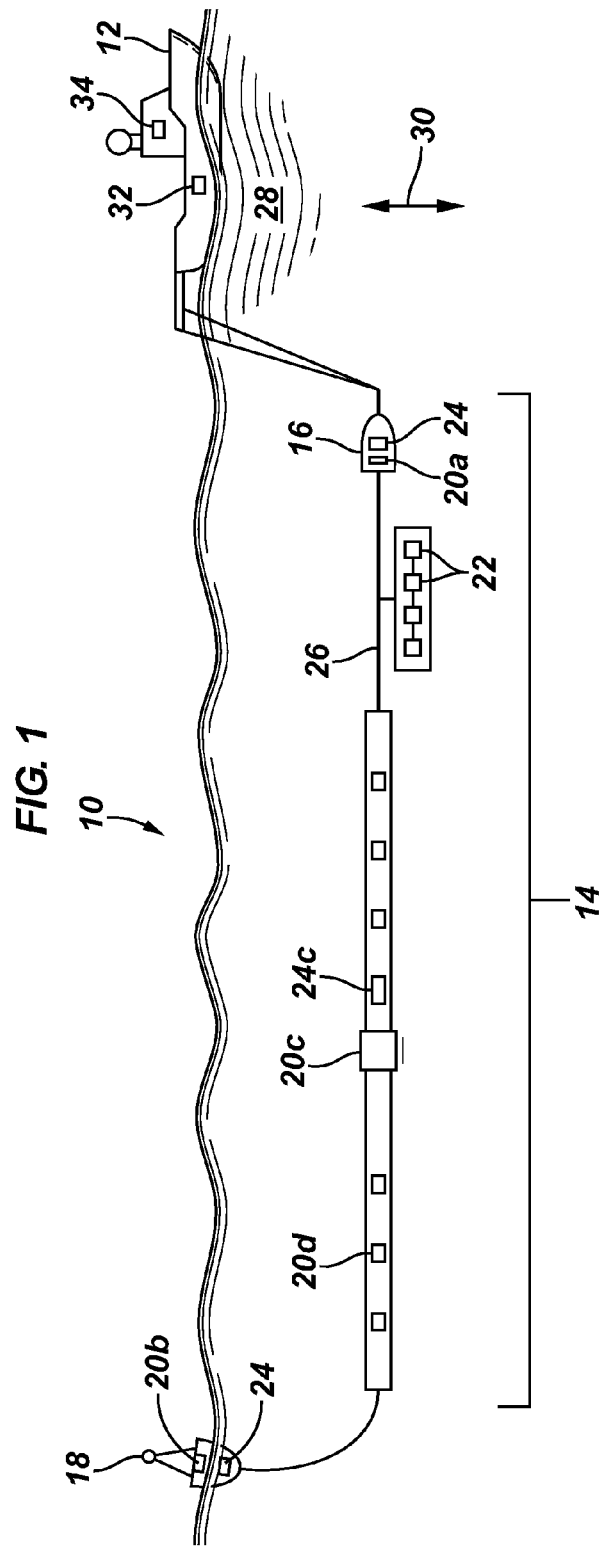
FIG. 1
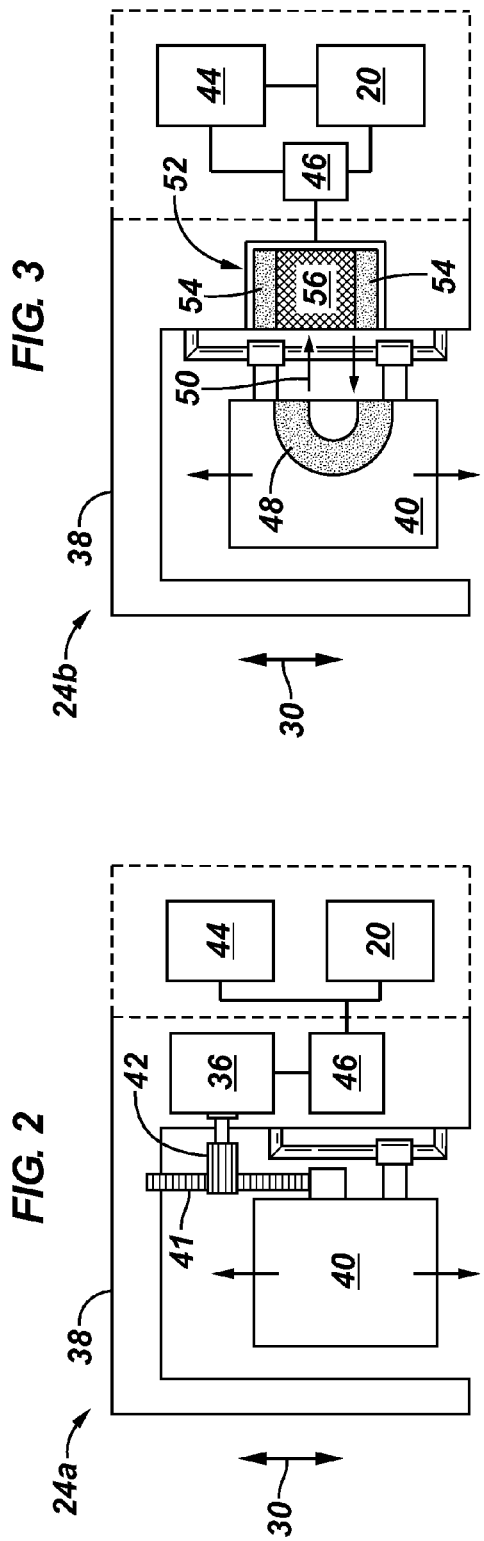
FIG. 2
FIG. 3

IN-SEA POWER GENERATION FOR MARINE SEISMIC OPERATIONS

FIELD OF THE INVENTION

The present invention relates in general to conducting marine seismic surveys, and more particularly to methods and apparatus for providing backup and/or primary electrical power to the in-sea electrical equipment.

BACKGROUND

In the field of marine seismic exploration, it is important to determine the configuration of the rock strata underlying the subsea earth's surface to locate subsurface structures favorable to the accumulation of oil and gas. In marine seismic surveying, this is accomplished by generating acoustic pulses or shock waves with sound sources, such as air guns, and by monitoring the resultant acoustic waves which reflect off the subsea interfaces with acoustic sensors. In a typical marine surveying operation, the seismic sound sources and the acoustic sensors are towed in designated patterns behind a seismic vessel. The basic principles of these surveying operations are well known to those skilled in the art.

Commonly, an array of seismic acoustic sensors, such as hydrophones, are configured in a seismic cable where the hydrophones are spaced along the length of the seismic cable. This seismic cable typically is called a streamer or streamer cable. The streamers are connected to apparatus on the vessel which includes the power source and the data control system.

To optimally develop 3-D marine surveys, to reduce the number of passes required of the seismic vessel in surveying a specific area and to improve the quality of the resulting geophysical information, multiple streamer cables typically are deployed in a pattern parallel to the centerline of the vessel. The streamer cables are separated from each other by calculated offset distances to provide the desired, spaced parallel pathways which minimize duplicate coverage but are adequate to cover the area to be surveyed. To obtain and maintain the desired lateral distances between adjacent streamer cables throughout the time period during which the seismic vessel is traversing the survey area, the streamer cables are attached at predetermined tow points on the cable to devices referred in the art of seismic exploration as pulla-vanes or para-vanes. The para-vanes are towed to the side of the vessel and provide the means to tow the streamer cables along pathways parallel to but laterally spaced from the pathway of the towing vessel.

The streamer cable typically is filled with a fluid which acts as a buoyancy material to keep the streamer cable at the desired depth beneath the surface of the water during the surveying operation. Because of the length of the streamers (sometimes several miles/kms in length), the streamers are in danger of colliding with other vessels. Therefore, a floatation device, such as a tail buoy, is attached to the submerged, tail end of the streamer to provide means to visibly approximate the location of the end of the streamer cable. The tail buoy is also quite useful for retrieval operations. If the vessel-end of the marine cable becomes detached from the vessel, the marine cable can be retrieved from the tail buoy end of the cable by using the tow line attached to the tail buoy and the streamer.

Additionally, the tail buoy commonly contains equipment for receiving data from a positioning system, such as the satellite navigation system known as the Global Positioning System (GPS), processing the data and transmitting the tail buoy's position information to a tracking system on the vessel. The tail buoy's positioning data not only provides a means to physically locate the tail buoy but can also be used to assist in determining the actual position of the end of the streamer cable. Increased accuracy in the calculated position of end of the streamer cable, and thereby increased accuracy for the positions of the acoustic sensors in the streamer cable, provides for increased precision in correlating the seismic signals received by the acoustic sensors to actual earth formations.

Various devices through the streamer require electricity to operate. This electricity is primarily provided from the vessel through the streamer and/or through batteries. Typically the equipment utilized for positioning the streamers and other spread elements such as the seismic source and tail buoys equipped with GPS has been batteries.

It is therefore a desire to provide an in-sea power generator for providing a source of electricity to the in-sea equipment. It is a still further desire to provide an in-sea power generation that is not propeller driven or provided by solar energy.

SUMMARY OF THE INVENTION

In view of the foregoing and other considerations, the present invention relates to a system and method for providing power to seismic equipment from energy harvested from ocean waves. Accordingly, in-sea power generators that do not use a propeller or solar panels and geological survey systems are provided. It is noted that "seismic" is used herein to include traditional seismographic surveys and the like, as well as electromagnetic studies, and the associated equipment.

A seismic survey system for use in a marine environment having sea waves includes at least one streamer carrying an electrically powered device that is electrically connected to a mechanism for generating electricity from movement of the sea waves.

A method for conducting seismic operations includes the steps of deploying a seismic streamer carrying an electrically powered device from a vessel into water having waves, providing an in-sea generator in electrical connection with the device, producing electricity from the in-sea generator by harvesting mechanical energy from the waves, and providing the produced electricity to the device. The produced electricity may be provided directly to the devices or stored in a battery, capacitor or other like device.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1 is a schematic side view illustration of a marine seismic system utilizing elements of the in-sea power generation of the present invention;

FIG. 2 is a partial sectional view of an example of an in-sea generator of the present invention;

FIG. 3 is a partial sectional view of another example of an in-sea generator of the present invention;

DETAILED DESCRIPTION

Figure 4:
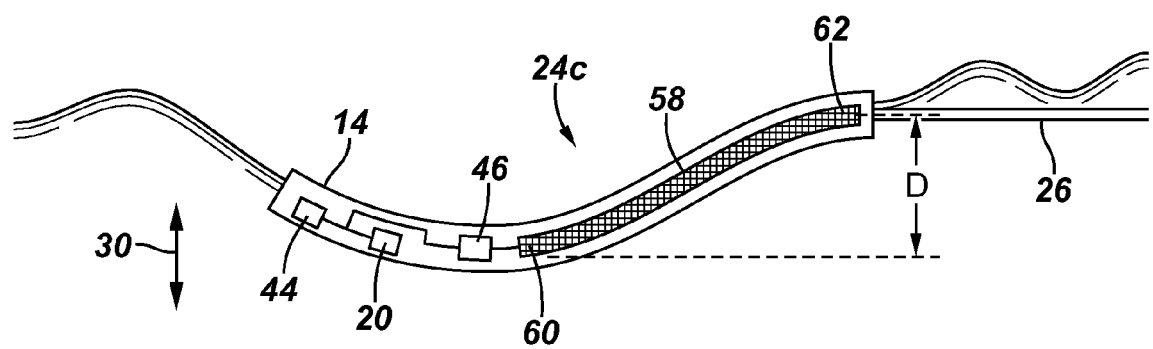
FIG. 4 is a partial sectional view of another example of an in-sea generator of the present invention.

Refer now to the drawings wherein depicted elements are not necessarily shown to scale and wherein like or similar elements are designated by the same reference numeral through the several views.

FIG. 1 is a schematic side view illustration of a seismic survey system, generally denoted by the numeral 10, utilizing in-sea power generation of the present invention. System 10 includes a marine vessel or ship 12, towing a streamer 14. Although FIG. 1 illustrates only one streamer 14, typically multiple streamers 14 will be deployed to form an array. Streamer 14 may include various elements such as a para-vane 16, a tail buoy 18, electrically powered devices 20 (compass, GPS, etc.), and air guns 22, and one or more in-sea generators 24.

Electrically powered devices 20 may include many devices which may be utilized in system 10, such as, without limitation, acoustic sources 20c such as pingers, acoustic receivers 20d and hydrophones, navigation systems 20a, positioning systems 20b, and various signal transmitters and receivers. The various electrical devices are utilized in various aspects of the marine seismic operations such as deployment of streamers 14 in an array, positioning of the array, ranging, and conducting seismic surveys. In-sea generators 24 are electrically connected with one or more of electrically powered devices 20 to provide primary, supplemental or auxiliary electrical power. Generators 24 may be connected to devices 20 through an electrical storage device such as a battery, or rechargeable battery.

Vessel 20 deploys streamer 14 via a cable 26 into a body of water 28 having movement designated as sea waves 30. As is known, sea waves represent movement to some degree throughout the water column. Cable 26 typically provides electrical power from a primary electrical power source 32 located on vessel 20 to at least some of the electrical devices 20 and also provides electrical and/or optical communication between the operations controls 34 on the ship seismic devices.

Electrical power is not provided to all of the electrical devices 20 via cable 26 at all times. For example, some devices are powered by batteries and some devices 20 require electrical power when power through streamer 14 (cable 26) is not available. For example, electrical power is needed for navigation and positioning devices that give headings or distance measures (acoustic ranging) when vessel power is not available. The present invention provides in-sea generator 24 to harvest mechanical energy from the water movement referred to as sea wave movement and convert it to electricity to one or more of devices 20.

Para-vane 16 is often deployed on streamer 14 to positioned and maintain streamer 14 is a desired position relative to vessel 20 and other streamers 14. Para-vane 16 may include electrical powered navigation and/or positioning equipment 20a. Often devices 20a are not powered by vessel 20 or they require electrical power when streamer power is not available. An in-sea generator 24 of the present invention may be deployed in para-vane 16 to provide the auxiliary power required for device 20a or other devices 20 positioned along streamer 14.

Another example of positioning of in-sea generator 24 is in tail buoy 18. Tail buoy 18 is commonly provided as a part of a streamer 14 to serve various purposes. Of relevance to the present invention, tail buoy 18 often carries positioning devices 20b such as a GPS and communication link, and a large platform for equipment. An in-sea generator 24 may be positioned in buoy 18 and electrically connected to devices 20b or other devices positioned along streamer 14.

Another example of positioning of in-sea generator 24 is along streamer 14. An in-sea generator 24 that may be integrated into or as a portion of cable 26 is described in more detail in reference to FIG. 4.

In-sea generator 24 converts the mechanical energy of movement of water body 28, or more particularly the movement of in-sea generator 24, into electricity. In-sea generator 24 does not utilize propellers and therefore avoids the disadvantages of propeller operated systems. As is noted, in-sea generator 24 may provide electricity directly to devices 20 or to recharge batteries.

Refer now to FIG. 2, wherein an example of a mechanical differential in-sea generator 24a is illustrated. In-sea generator 24a includes a rotary generator 36 that is positioned in a housing 38 and a mass or load 40 that is moveably and functionally connected to rotary generator 36. It should be recognized that housing 38 may be a portion of a device such as buoy 18 or para-vane 16. Mass 40 is connected to generator 36 via shaft 41 and gear 42, or other suitable connecting mechanisms. In operation, load 40 moves relative to generator 36 in response to the sea wave motion actuating generator 36 to produce electricity. In-sea generator 24a is then electrically connected to at least one electrical device 20. In-sea generator 24a may be connected directly to electrical device 20 or may be connected to a battery or other electrical storage device 44. In-sea generator 24a may further include an interface circuit 46 to selectively supply the generated power when and where needed.

Refer now to FIG. 3 wherein a magnetic field in-sea generator 24b is illustrated. In-sea generator 24b includes a permanent magnet 48 that generates a magnetic field 50, and a magnetic field sensor or sensing element 52. Magnetic field sensor 52 includes a first magnetostrictive material layer 54 bonded to a second electroactive layer 56. First layer 54 responds to variations in magnetic field 50 by generating stress and second layer 56 responds to stress by producing electricity. Magnet 48 is positioned so as to be moveable relative to magnetic field sensor 52 in response to the motion of the sea waves 30.

Refer now to FIG. 4 wherein an example of an elongated in-sea generator 24c is provided. In-sea generator includes an elongated, flexible piezoelectric member 58 having a first end 60 and a second end 62. Member 58 may be formed of a material such as polyvinylidene fluoride ("PVDF"). As illustrated, member 58 may be formed as a portion of cable 26 of streamer 14. Piezoelectric member 58 produces electricity from stress induced in the member. Wave motion 30 creates a deformation "D" in piezoelectric member 58 which induces stress which is converted into electricity.

Figure 5:
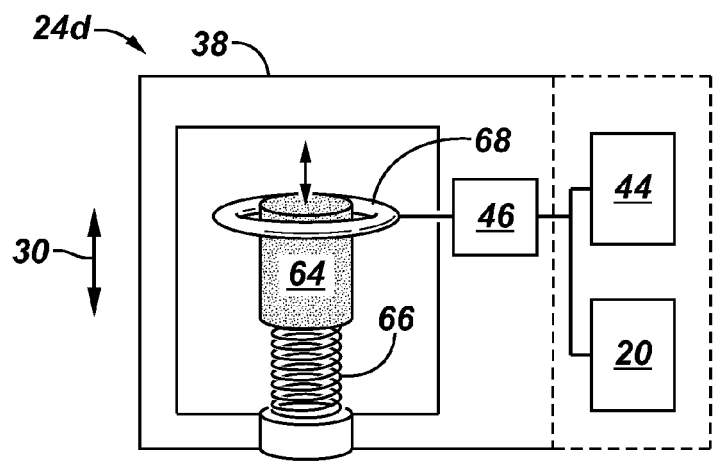
FIG. 5 is a partial sectional view of another example of an in-sea generator of the present invention.

Refer now to FIG. 5 wherein a micro-electro-mechanical system (MEMS) resonator type in-sea generator 24d is illustrated. In-sea generator 24d includes a magnetic mass 64 connected to housing 38 by a spring 66 to move in response to wave motion 30. Magnetic mass 64 is positioned proximate to coil 68 such that the movement of mass 64 induces a voltage in coil 68.

From the foregoing detailed description of specific embodiments of the invention, it should be apparent that a system and method for generating power for marine seismic equipment based on displacement by ocean waves has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A seismic survey system for use in a marine environment having sea waves, the system comprising:
    a streamer carrying an electrically powered device, the streamer towed through a body of water by a vessel; and
    an in-sea generator to produce electricity in response to vertical movement of the sea waves, the in-sea generator functionally connected to the electrically powered device, wherein the in-sea generator comprises:
        a generator towed through the body of water; and
        a mass operationally connected to the generator and positioned to move vertically up and down relative to the towed direction of the generator in response to the vertical movement of the mass relative to the generator actuates the generator to produce electricity.

2. The system of claim 1, wherein the in-sea generator is carried by a tail buoy connected to the streamer.

3. The system of claim 1, wherein the in-sea generator is carried by a para-vane.

4. The system of claim 1, wherein the generator is a rotary generator.

5. The system of claim 4, wherein the in-sea generator is carried by a tail buoy connected to the streamer.

6. The system of claim 4, wherein the in-sea generator is carried by a para-vane.

7. The system of claim 1, wherein
    the mass comprises a magnet that generates a magnetic field; and
    the generator comprises a magnetic field sensing element having a first material connected to a second material, the first material responding to variations in the magnetic field by generating a stress and the second material responding to stress by producing electricity.

8. The system of claim 7, wherein the in-sea generator is carried by a tail buoy connected to the streamer.

9. The system of claim 7, wherein the in-sea generator is carried by a para-vane.

10. A method for conducting seismic operations, the method comprising:
    towing a seismic streamer from a vessel through a body of water having waves moving vertically relative to the towed direction, the streamer carrying an electrically powered device;
    towing an in-sea generator in electrical connection with the electrically powered device, wherein the in-sea generator comprises a mass operationally connected to the generator and positioned to move vertically up and down relative to the generator in response to the vertical movement of the sea waves;
    producing electricity from the generator in response to the vertical motion of the waves moving the mass vertically up and down relative to the generator thereby harvesting mechanical energy from the waves.

11. The method of claim 10, wherein
    the mass comprises a magnet that generates a magnetic field; and
    the generator comprises a magnetic field sensing element having a first material that responds to variations in the magnetic field by generating a stress connected to a second material that responds to stress by producing electricity.

12. The method of claim 10, wherein the electrical device is a positioning device and the positioning device and the in-sea generator are disposed in a buoy carried by the streamer.

13. The method of claim 10, wherein the in-sea generator is carried by a tail buoy carried by the streamer.

14. The method of claim 10, wherein the in-sea generator is carried by a para-vane connected to the streamer.

15. A method for conducting marine seismic operations, the method comprising:
    towing a seismic streamer from a vessel through a body of water having waves moving vertically in the body of water, the streamer carrying an electrically powered device, a buoy, and an in-sea generator carried by the buoy and in electrical connection with the electrically powered device, the in-sea generator including a generator and a mass moveably connected to the generator and positioned so as to move vertically up and down relative to the generator and the towed direction;
    producing electricity from the in-sea generator in response to the vertical motion of the waves moving the mass vertically up and down relative to the generator thereby harvesting mechanical energy from the waves; and
    providing the produced electricity to the device.

16. The system of claim 1, wherein the in-sea generator does not utilize a propeller.

17. The method of claim 10, wherein the in-sea generator does not utilize a propeller.

18. The method of claim 15, wherein the in-sea generator does not utilize a propeller.

* * * * *